Figure 1:
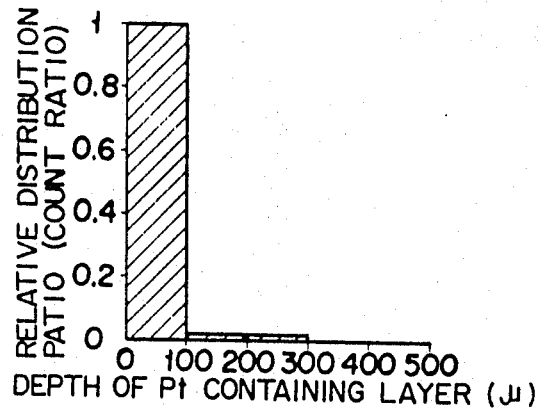

United States Patent [19]
Ohara et al.

[11] 3,897,368
[45] July 29, 1975

[54] METHOD FOR THE PRODUCTION OF NOBLE METAL CATALYSTS

[75] Inventors: Takashi Ohara, Nishinomiya; Shoichi Ichihara, Toyonaka; Koichi Saito, Suita; Tetsuji Ono, Amagasaki, all of Japan

[73] Assignee: Nippon Shokubai Kagaku Kogyo Co., Ltd., Osaka, Japan

[22] Filed: Nov. 29, 1973

[21] Appl. No.: 419,948

[30] Foreign Application Priority Data
Nov. 30, 1972 Japan.............................. 47-119395
Feb. 28, 1973 Japan.............................. 48-23133
Mar. 6, 1973 Japan.............................. 48-25671

[52] U.S. Cl......... 252/466 PT; 252/455 R; 252/459; 252/460; 252/463; 423/210
[51] Int. Cl............................................. B01j 11/08
[58] Field of Search.. 252/466 PT, 463, 460, 455 R, 252/459

[56] References Cited
UNITED STATES PATENTS

| | | | |
|---|---|---|---|
| 2,852,474 | 9/1958 | Arundale et al. | 252/466 PT |
| 3,325,247 | 6/1967 | Magee et al. | 252/463 X |
| 3,331,787 | 7/1967 | Keith | 252/466 PT X |
| 3,785,998 | 1/1974 | Hoekstra | 252/466 PT X |

*Primary Examiner*—Helen M. S. Sneed
*Attorney, Agent, or Firm*—Armstrong, Nikaido & Wegner

[57] ABSTRACT

Noble metal catalysts are prepared by supporting a noble metal onto a refractory porous inorganic support from an aqueous medium containing a noble metal or a compound thereof in the presence of a nonionic surface active agent of poly(oxyethylene) type having an average molecular weight of at least 500 and subjecting the so treated support to activation.

16 Claims, 5 Drawing Figures

METHOD FOR THE PRODUCTION OF NOBLE METAL CATALYSTS

This invention relates to a method of supporting a noble metal catalyst on a support and, particularly, to a method for the production of highly active and highly durable catalysts by depositing in high concentrations on the external surface of a catalyst a platinum group metal in the Periodic Table on to a refractory porous support, such as alumina, silica, silica-alumina or alumina-magnesia.

Platinum, palladium rhodium and like metals belonging to the platinum group in the Periodic Table have for a long time been known to be of an extremely high activity as catalytic substances and, by virtue of the high activity as catalysts, occupy a very important position as industrial oxidation, petroleum reforming and hydrogenation catalysts in spite of their expensiveness. Thus, it is a usual way for developing a high activity with a small quantity of such a noble metal to supported by dispersion on to a support having a higher surface area and, in addition, it will be expected that a high catalytic activity is exhibited using a lesser quantity of a noble metal by dispersing the noble metal only on the surface layer of a support since a catalytic reaction mainly takes place on the external surface of a catalyst.

Some methods for the production of supported noble metal catalysts have already been developed on the basis of such an idea and, for instance, in Japanese Patent Publication No. 11093/1968 there is disclosed a method for the production of catalyst by impregnating a support with a chloroplatinate solution and calcining the impregnated support in which the chloroplatinate solution is added with a thiocarboxylic acid, such as thiomalic acid or thioglycolic acid, to prevent the platinum compound penetrating into the inside of the support thereby to enhance the catalytic activity of the catalyst obtained. However, there is a doubt about the effect of enhancing the catalytic activity by depositing platinum only on to the surface of a support in accordance with the aforesaid method since, as indicated by examples in the above specification, some of the catalyst prepared in the aforesaid method are inferior in initial activity for oxidation of both carbon monoxide and hydrocarbons to one prepared using no thiocarboxylic acid.

In Japanese Patent Publication No. 25369/1971, there is disclosed a method for supporting a noble metal in a high concentration on to the external surface of a support by impregnating a support with a solution of a noble metal compound containing an alcohol. However, disadvantageously from an economical point of view, in this method an alcohol is used in a strength of 50 to 100 % by weight making the method expensive and the method needs a step of collecting evaporated alcohol since the alcohol inevitably evaporates during the immersion of a support in the alcoholic solution to pollute air. And, there is a danger of explosion or fire on burning of the alcohol. In Japanese Patent Publication No. 35670/1962, there is disclosed a method for supporting palladium on to the surface of a support by adding an alkali carbonate, such as sodium carbonate or potassium carbonate, to an acidic aqueous solution of a palladium salt for adjusting the pH of the solution to 2.0 to 4.8. However, this method also is unsatisfactory since an alkali metal, such as potassium or sodium incorporated in the finished catalyst lowers the catalytic activity of the catalyst.

Accordingly, an object of the present invention is to provide an improved method of supporting a noble metal on the surface of a support.

Another object of the present invention is to provide a method of supporting a platinum group metal in the Periodic Table in a high concentration on the surface of a refractory porous support.

A further object of the present invention is to provide noble metal catalysts of high activity and durability.

A still another object of the present invention is to provide an improved method for the production of noble metal catalysts.

In accordance with the method of the present invention, noble metal catalysts are prepared by supporting a noble metal on a refractory porous inorganic support from an aqueous dispersion or solution of a noble metal or its compound in the presence of a nonionic surface active agent of poly(oxyethylene) type and activating the so treated support.

In accordance with the present invention, a poly(oxyethylene) type nonionic surface active agent of an average molecular weight of at least 500 employed hinders a catalytic substance from penetrating into the inside of a porous support by virtue of its high molecular surface tension and low permeability, and this makes it possible to support a catalyst matter in a high concentration on the external surface of a support by mere use of a small amount of an inexpensive poly(oxyethylene) type nonionic surface active agent and, in addition, the surface active agent has an effect of enhancing catalytic activity on the subsequent calcination or reduction of the impregnated support. Accordingly, the supported catalyst thus obtained can retain its high activity for a long period of time and effectively employed as a catalyst for complete oxidation of carbon monoxide and hydrocarbons obtained in internal combustion engine exhaust gases and industrial waste gases or a reduction catalyst for nitrogen oxides ($NO_x$).

As the waste gases exhausted from general industrial plants which may be applied the catalytic purification process according to the present invention, there are waste gases mainly containing solvents such as waste gases from enameled-wire baking furnaces and off-set printing presses; noxious and irritating organic compound containing gases such as formaldehyde as exhausted from synthetic fiber manufacturing plants such as vinylon; waste gases exhausted from plants for the preparation of phthalic anhydride, maleic anhydride, acrylic acid, ethylene oxide and like organic compounds by catalytic vapor phase oxidation and waste gases exhausted from tobacco manufacturing plants. Especially, these organic solvents are very harmful for human body and are apt to explode depending the concentration, so they should be removed as possible from general industrial plants. Furthermore, small quantity of organic compounds which are contained in the wasted gas from the general industrial plants are mainly noxious and have bad odor and they have unbearable bad odor even if contents thereof are several ppm, so they should be removed completely.

Figure 2:
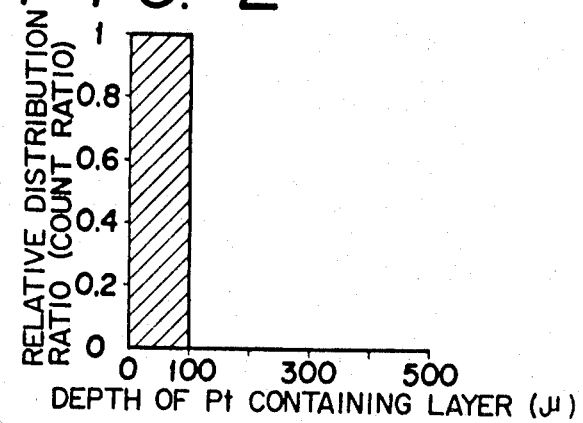
Figure 3:
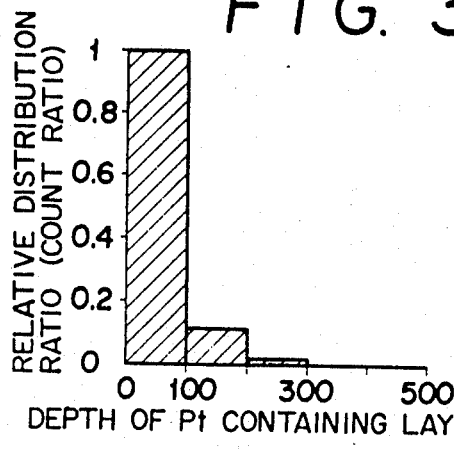
Figure 4:
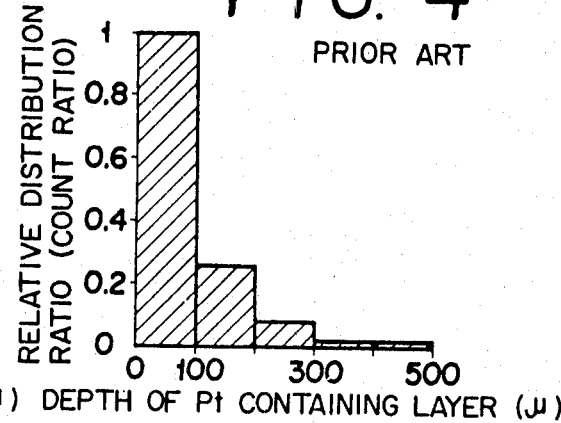
Figure 5:
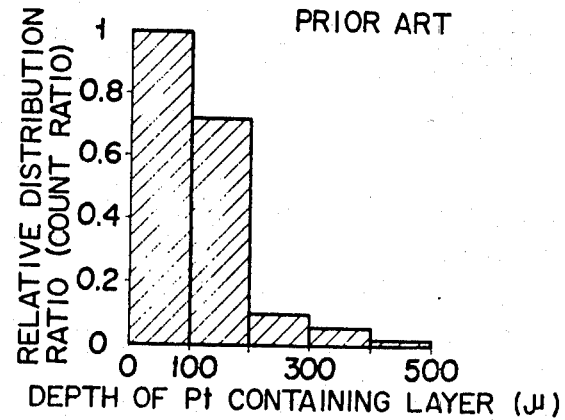

The present invention will be readily understood from the following description, when read together with the accompanying drawings, wherein:

FIG. 1 is a graph indicating the relative distribution ratio of platinum in a catalyst prepared by using a Pluronicstype nonionic surface active agent, FIG. 2 is a graph indicating the relative distribution ratio of platinum in a catalyst prepared by using a Tetronics-type nonionic surface active agent, FIG. 3 is a graph indicating the relative distribution ratio of platinum in a catalyst prepared by using a polyethylene glycol, FIG. 4 is a graph indicating the relative distribution ratio of platinum in a catalyst prepared by using ethanol, and FIG. 5 is a graph indicating the relative distribution ratio of platinum in a catalyst prepared without using any additive.

These results were derived from electron probe microanalysis measurements.

Illustrating the method of the present invention in detail, a noble metal or its compound is dissolved or dispersed in water, to the resulting solution or dispersion there is added a poly(oxyethylene) tupe nonionic surface active agent of an average molecular weight of at least 500, and an inorganic support is soaked therein or the noble metal-containing catalyst solution containing the surface active agent is condensed evaporated to dryness on the support to support the noble metal or its compound on the support. After drying, the support is subjected to calcination or reducing treatment. Instead of adding the surface active agent to a catalytic substance containing solution, the surface active agent may be dissolved in water to form an aqueous solution which is used for pretreatment of a support.

By impregnating a support with a noble metal- or its compound-containing solution in the presence of a poly(oxyethylene) type nonionic surface active agent, as mentioned above, the noble metal or its compound is supported only on the surface of the support to give a finished catalyst after post treatment having a very high activity, a high thermal durability and high supporting strength (attrition resistance) and other excellent practical properties.

The poly(oxyethylene) type nonionic surface active agent used in the method of the present invention should be of an average molecular weight of at least 500, preferably at least 1,000, because those of an agerage molecular weight of less than 500 are too penetrative to make it difficult to support a catalytic matter in a high concentration only on the surface of a support. Accordingly, as the nonionic surface active agent suitably used are those relatively low penetration. The aforesaid nonionic surface active agent is used in an amount usually of 0.1 to 50 g, preferably of 0.2 to 20 g per litre of support. In case where a support is soaked in a catalytic substance solution, the nonionic surface active agent is used in a concentration usually of 0.01 to 10, preferably of 0.02 to 5 % by weight of the solution, while, in case where a catalytic substance solution is concentrated and evaporated to dryness on a support, the surface active agent is used in a concentration of 0.01 to 40, preferably of 0.04 to 30 % by weight.

Representatives of the poly(oxyethylene) type nonionic surface active agent are: polyethylene glycols $HO(CH_2CH_2O)_nH$ wherein $n = 11 - 90$; poly(oxyethylene) glycol alkyl ethers $R-O(CH_2CH_2O)_nH$ wherein R is alkyl groups containing 6 to 30 carbon atoms and $n = 3 - 30$, such as poly(oxyethylene) lauryl ether, poly(oxyethylene) cetyl ether, poly(oxyethylene) stearyl ether and poly(oxyethylene) oleyl ether; poly(oxyethylene) alkylaryl ethers

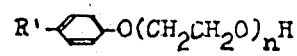

wherein R' is alkyl group containing 6-12 carbon atoms and $n = 3-30$, such as poly(oxyethylene) octylphenyl ether and poly(oxyethylene) nonylphenyl ether; poly(oxyethylene) alkyl esters $R-COO(CH_2CH_2O)_nH$ or $R-COO(CH_2CH_2O)_{n-1}-CH_2CH_2COO-R$ wherein R is alkyl group containing 6 to 24 carbon atoms and $n = 3$ to 30, such as poly(oxyethylene) glycol monocapronate, poly(oxyethylene) glycol monooleate, poly(oxyethylene)glycol monolaurate, poly(oxyethylene)glycol monostearate, poly(oxyethylene)glycol dilaurate and poly(oxyethylene)glycol distearate; poly(oxyethylene) alkylamines $R-NH(CH_2CH_2O)_nH$ or

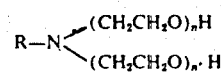

wherein R is alkyl group containing 6 to 30 carbon atoms and $n$ and $n' = 3-30$, such as poly(oxyethylene) laurylamine, poly(oxyethylene) cetylamine and poly(oxyethylene) stearylamine; poly(oxyethylene) alkylamides $R-CONH(CH_2CH_2O)_nH$ or

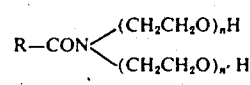

wherein R is alkyl group containing 6 to 30 carbon atoms and $n$ and $n' = 3-30$, such as poly(oxyethylene) laurylamide and poly(oxyethylene) stearylamide; fatty acid esters of poly(oxyethylene)sorbitane

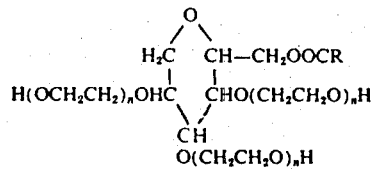

wherein R is alkyl group containing 6 to 24 carbon atoms and $n = 3-30$, such as poly(oxyethylene)sorbitane monolaurate, poly(oxyethylene)sorbitane monostearate and poly(oxyethylene)sorbitane mono-oleate; and poly(oxyethylene)-poly(oxypropylene) cocondensates of Pluronics type $HO(CH_2CH_2O)_a(CH_3CHCH_2O)_b(CH_2CH_2O)_cH$ wherein $a$, $b$ and $c > 1$ and $(a + b + c) = 20-400$ and of Tetronics type

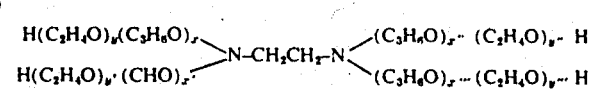

wherein $x$ to $x'''$ and $y$ to $y''' > 1$ and $x+x'+x''+x'''+y+y'+y''+y''' = 20-800$, preferred are those containing major proportion of oxyethylene units.

The inorganic support used in the present invention includes particulated porous refractory materials, such as alumina, silica, silica-alumina, alumina-silica-magnesia, silicon-carbide, silica-magnesia and the like, and may be used in the form of pellets or granules of an average diameter usually of 1.5 to 15 mm, preferably of 2 to 8 mm.

The noble metal used in the present invention is a metal belonging to the platinum group in the Periodic Table, such as ruthenium, rhodium, palladium, osmium, iridium and platinum, and used in the form of simple substance or compound either alone or in combination with others. Though these raw materials for catalyst are usually used in the form of water soluble nitrates, such as palladium nitrate, ruthenium nitrate or rhodium nitrate; chlorides, such as palladium chloride, iridium hexachloride or rhodium chloride, metallic acids, such as chloroplatinic acid; and acetates, such as palladium acetate, they may be used in the form of metallic colloid. The noble metal or its compound is supported in an amount, as metal, of 0.01 to 5 g per litre of support, preferably 0.05 to 2 g per litre of support.

The support supporting thereon a noble metal or its compound, prepared in the supporting treatment as mentioned above, it then dried at 30° to 250°C, preferably at 80° to 200°C, and then activated the dried catalyst composition. The activation of the catalyst composition may be achieved by calcining it at 300° to 700°C, preferably at 400° to 600°C, in an oxidative atmosphere, e.g. in air, or subjecting to reduction at 150° to 600°C, preferably at 200° to 550°C, in a reductive atmosphere, e.g. in a stream of gaseous hydrogen or of gaseous hydrogen-nitrogen, to obtain a finished catalyst.

EXAMPLE 1

50 cc of an aqueous chloroplatinic acid solution containing 0.03 g, as metallic platinum, of chloroplatinic acid was put in an evaporating dish, then added thereto 0.25 g of a Pluronics-type nonionic surface active agent, flaky propylene oxide(PO)-ethylene oxide(EO) block copolymer of an average molecular weight of 8,500 and of an ethylene oxide content of 80 % by weight. After dissolving the surface active agent, 100 cc of an activated alumina in the form of cylinders of a diameter of 3 mm and an average length of 5 mm and having a surface area of about 110 m²/g was impregnated in the solution and, after sufficiently stirred, heated on a water bath to concentrate and evaporate to dryness the solution. The chloroplatinic acid was well dispersed in aqueous medium by the aid of the surface active agent.

The chloroplatinic acid supporting catalyst thus obtained was dried at 100°C for about 3 hours and then calcined at 500°C for 1 hour in an atmosphere of gaseous hydrogen to obtain a finished catalyst.

EXAMPLE 2

50 cc of an aqueous palladium nitrate solution containing, as metallic palladium, 0.08 g of palladium nitrate was put in an evaporating dish, then added thereto 0.2 g of a Pluronics-type nonionic surface activ agent, a PO-EO block copolymer of an average molecular weight of 11,000 and of an EO content of 80 % by weight. After dissolving, 100 cc of an activated alumina in the form of spheres of an average diameter of 3 mm having a surface area of about 150 m²/g was impregnated with the solution and, after evaporation to dryness in the similar manner as in Example 1, dried and calcined at 600°C for 5 hours in air to obtain a finished catalyst.

EXAMPLE 3

50 cc of a mixed aqueous solution of chloroplatinic acid palladium chloride containing the both compound in the weight ratio as metallic platinum and metallic palladium of 3:1 and in the total weight as noble metal of 0.03 g was put in an evaporating dish, then dissolved therein 0.04 g of the same surface active agent as used in Example 2. 100 cc of the same activated alumina as used in Example 1 was impregnated with the solution and subjected to condensation, drying and reduction in the same manner as in Example 1 to obtain a finished catalyst.

EXAMPLE 4

50 cc of a mixed aqueous solution of chlorplatinic acid and iridium hexachloride in the weight ratio of Pt to Ir of 3:1 and containing the both compound in the total noble metal content of 0.03 g, then dissolved therein 0.04 g of a Pluronics-type nonionic surface active agent, a flaky PO-EO block copolymer of an average molecular weight of 10,000 and an EO content of 70 % by weight. 100 cc of the same activated alumina support as used in Example 2 was impregnated with the solution and then subjected to condensation, drying and reduction in the same manner as in Example 1 to obtain a finished catalyst.

EXAMPLE 5

50 cc of a mixed aqueous solution of chloroplatinic acid and rhodium chloride containing the both compounds in a weight ratio as metals of 3:1 and in a total noble metal content of 0.03 g was put in an evaporating dish, then dissolved therein 0.04 g of a Pluronics-type nonionic surface active agent, a liquid PO-EO block copolymer of an average molecular weight of 4,100 and an EO content of 50 % by weight. 100 cc of the same activated alumina as used in Example 2 was impregnated with the solution and subjected to condensation, drying and reduction in the same manner as in Example 1 to obtain a finished catalyst.

EXAMPLE 6

The same procedure as in Example 3 was repeated except that there was used, in place of 0.04 g of a Pluronics-type nonionic surface active agent, 0.25 g of "Emasole 1130" supplied by Kao Atlas Co., Japan, a nonionic surface active agent consisting of a poly(oxyethylene)sorbitane monolaurate of an average molecular weight of 1,100, prepared by 17 moles of ethylene oxide per mole of sorbitane monolaurate, to obtain a finished catalyst.

EXAMPLE 7

The same procedure as in Example 3 was repeated except that there was used, in place of 0.04 g of a Pluronics-type nonionic surface active agent, 0.04 g of a nonionic surface active agent consisting of a poly(oxyethylene) alkyl ether of an average molecular weight of 731 and an average number of moles of ethylene oxide added in molecule of 12.

COMPARATIVE EXAMPLE (CONTROL) 1

50 cc of an aqueous palladium nitrate solution containing the compound in an amount corresponding to 0.08 g of metallic palladium was put in an evaporating dish, then put therein 100 cc of the same activated alu mina as used in Example 2. After thoroughly mixed, the support was subjected to condensation and evaporation to dryness on a water bath and then to drying and calcination in the manner as in Example 2 to obtain a finished catalyst.

COMPARATIVE EXAMPLE (CONTROL) 2

The same procedure as in Example 3 was repeated except that there was used no nonionic surface active agent to obtain a finished catalyst.

COMPARATIVE EXAMPLE (Control) 3

The same procedure as in Example 3 was repeated except that there was used poly(oxyethylene) alkyl ether of an average molecular weight of 333 as a sole nonionic surface active agent to obtain a finished catalyst.

EXAMPLE 8

The finished catalysts obtained in Examples 1 to 7 and Controls 1 to 3 were subjected to the following initial activity test. Each 10 cc of the catalysts were packed in separate stainless steel reaction tubes of an inner diameter of 18 mm, A mixed gas consisting of 1 % by volume of carbon monoxide, 500 ppm of propylene of 375 ppm of n-butane (corresponding to 1,500 ppm of methane), 5 % by volume of oxygen, 10 % by volume of steam and the balance of nitrogen was introduced, at temperatures on the entrance of the reaction tube as indicated in the following Table 1, into the reaction tube at a space velocity of 15,000 hr$^{-1}$ for 10 to 10 minutes until the system reached a stationary state and then, the effluent gas was subjected to measurements of CO by means of a non-dispersive infrared gas analyzer, of propylene or butane by means of a flame ionization detector gas analyser.

The results obtained were as summerized in the following Table 1, wherein each numeral indicating a per cent conversion (a purification rate) of hydrocarbon (HC) or carbon monoxide (CO).

Table 1

| Example Nos. of catalyst | Propylene-CO system | | | | | | | | Butane-CO system | | | | | | | |
|---|---|---|---|---|---|---|---|---|---|---|---|---|---|---|---|---|
| | 200°C | | 225°C | | 250°C | | 300°C | | 200°C | | 225°C | | 350°C | | 400°C | |
| | CO | HC | CO | HC | CO | HC | CO | HC | CO | HC | CO | HC | CO | HC | CO | HC |
| Example 1 | 70 | 53 | 100 | 93 | 100 | 96 | 100 | 96 | 100 | 3 | 100 | 10 | 100 | 28 | 100 | 60 |
| Example 2 | 100 | 67 | 100 | 93 | 100 | 96 | 100 | 98 | 100 | 0 | 100 | 2 | 100 | 40 | 100 | 70 |
| Example 3 | 100 | 91 | 100 | 96 | 100 | 97 | 100 | 98 | 100 | 1 | 100 | 3 | 100 | 35 | 100 | 62 |
| Example 4 | 71 | 49 | 100 | 94 | 100 | 96 | 100 | 97 | 100 | 0 | 100 | 2 | 100 | 15 | 100 | 54 |
| Example 5 | 86 | 67 | 100 | 93 | 100 | 96 | 100 | 98 | 100 | 1 | 100 | 3 | 100 | 19 | 100 | 59 |
| Example 6 | 95 | 82 | 100 | 94 | 100 | 96 | 100 | 97 | 100 | 0 | 100 | 3 | 100 | 28 | 100 | ,4 |
| Example 7 | 87 | 75 | 100 | 94 | 100 | 96 | 100 | 97 | 100 | 0 | 100 | 2 | 100 | 25 | 100 | 4 |
| Control 1 | 17 | 5 | 90 | 76 | 99 | 85 | 99 | 90 | 89 | 0 | 95 | 3 | 100 | 15 | 100 | 38 |
| Control 2 | 27 | 4 | 100 | 95 | 100 | 96 | 100 | 96 | 12 | 0 | 88 | 4 | 100 | 21 | 100 | 34 |
| Control 3 | 21 | 3 | 100 | 94 | 100 | 96 | 100 | 96 | 100 | 0 | 100 | 4 | 100 | 9 | 100 | 37 |

The above Table indicates that all the catalysts in accordance with the present invention have high activities corresponding to a purification at 200°C of 50 % or more while, on the other hand, none of Controls has such a high activity, with respect to propylene. With respect to n-butane, the catalysts in accordance with the present invention are superior to the catalysts of Controls at a high temperatures as 400°C in the value of purification rate.

EXAMPLE 9

The activities and stabilities of the catalysts prepared in Examples 1 to 7 and Controls 1 to 3 were evaluated by the following tests using an exhaust gas from an automobile engine, Each 30 cc of the catalysts were packed in separate stainless steel reaction tubes of an inner diameter of 30 mm and an exhaust gas from a commercially available four-cylindered gasoline engine of a displacement of 1,600 cc, operated at 2,000 r.p.m under a boost pressure of 450 mm Hg on a lead-free gasoline, was passed therethrough for purification test. Portion of the exhaust gas and a necessary amount of secondary air were mixed together and, after preheated to 400°C by means of an electric furnace, passed through the reaction tube at a rate of 15 litres/minute for 100 hours. During the run, hydrocarbons, carbon monoxide and oxygen contained in the effluent were measured by means of a Mexa 18-type analyser, manufactured by Kabushiki Kaisha Horiba Seisakusho, Japan. The composition of the diluted exhaust gas on the entrance of the reaction tube was: carbon monoxide 0.5% by volume; total hydrocarbons (calculated as methane) 1,500 ppm; oxygen 5 to 6 % by volume; and the balance being carbon dioxide, nitrogen, water and other impurities. The catalyst temperature was of 440° to 480°C. The results obtained were as summerized in the following Table 2.

Table 2

| | Conversion (%) of CO and hydrocarbons | | | | | | | | | |
|---|---|---|---|---|---|---|---|---|---|---|
| Example Nos. of catalyst | 0 hr | | 10 hr | | 25 hr | | 50 hr | | 100 hr | |
| | CO | HC | CO | HC | CO | HC | CO | HC | CO | HC |
| 1 | 98 | 93 | 98 | 92 | 99 | 92 | 98 | 93 | 98 | 92 |
| 2 | 99 | 94 | 99 | 92 | 98 | 91 | 98 | 91 | 98 | 91 |
| 3 | 99 | 94 | 99 | 93 | 98 | 94 | 99 | 94 | 99 | 94 |
| 4 | 99 | 93 | 98 | 94 | 99 | 94 | 99 | 94 | 99 | 94 |
| 5 | 99 | 95 | 99 | 94 | 98 | 94 | 99 | 93 | 99 | 94 |
| 6 | 98 | 93 | 98 | 94 | 99 | 94 | 99 | 93 | 98 | 93 |
| 7 | 98 | 94 | 99 | 93 | 99 | 93 | 98 | 92 | 98 | 93 |
| Control 1 | 98 | 93 | 98 | 89 | 97 | 85 | 97 | 83 | 96 | 82 |
| Control 2 | 97 | 90 | 97 | 88 | 97 | 87 | 96 | 87 | 96 | 86 |
| Control 3 | 97 | 92 | 98 | 90 | 96 | 88 | 97 | 89 | 96 | 88 |

The results summarized in the above Table indicate that the catalysts in accordance with the present invention exhibited throughout the test CO conversions of 98 to 99 % and HC conversions of 91 to 95 % while those of Controls degraded terribly during the run of test.

EXAMPLE 10

The relative distribution of supported platinum on a support from its surface to its core was determined on (1) a catalyst prepared in Example 1, (2) a catalyst prepared in the same procedure as in Example 1 except that there was used an 80 % aqueous ethanol for solution of chloroplatinic acid without using any nonionic surface active agent, and (3) a catalyst prepared in the same procedure as in Example 1 except that no nonionic surface active agent was employed. The results were indicated in FIG. 1 for catalyst (1), FIG. 4 for catalyst (2) and FIG. 5 for catalyst (3). These results were derived from electron probe microanalysis measurements.

EXAMPLE 11

50 cc of an aqueous chloroplatinic acid solution containing 0.03 g of platinum as metal was put in an evaporating dish, then added and dissolved therein 0.4 g of a flaky Tetronics-type propylene oxide (PO)-ethylene oxide (EO) block copolymer of an average molecular weight of 9,000 and an ethylene oxide content of 70 % by weight. 100 cc of an activated alumina in the form of cylinders of a diameter of 3 mm and an average length of 5 mm having a surface area of about 70 m²/g was impregnated with the solution and concentrated and evaporated to dryness on a water bath. The chloroplatinic acid was well dispersed by the aid of the surface active agent. The catalyst thus supported thereon chloroplatinic acid was dried at 100°C for about 3 hours and then calcined at 400°C for 2 hours in an atmosphere of gaseous hydrogen to obtain a finished catalyst. The catalyst was subjected to determination of the relative distribution of platinum in the same method as in Example 10 to obtain a result as shown in FIG. 2.

EXAMPLE 12

50 cc of an aqueous palladium nitrate solution containing 0.08 g of palladium calculated as metal was put in an evaporating dish, then added thereto 0.2 g of a flaky Tetronics-type PO-EO block copolymer of an average molecular weight of 20,000 and an EO content of 80 % by weight. After dissolving the surface active agent, 100 cc of an activated alumina having a surface area of about 150 m²/g in the form of spheres of an average diameter of 3 mm was impregnated with the solution, evaporated to dryness in the similar manner as in Example 11 and then calcined at 600°C for 3 hours in air to obtain a finished catalyst.

EXAMPLE 13

50 cc of a mixed aqueous solution of chloroplatinic acid and palladium chloride containing platinum and palladium in a weight ratio of 5:2 and in the total weight as noble metals of 0.04 g was put in an evaporating dish, then dissolved therein 0.04 g of the same surface active agent as used in Example 11. The solution was impregnated into 100 cc of the same activated alumina as used in Example 11 and processed in the same manner as in Example 11 to obtain a finished catalyst.

EXAMPLE 14

50 cc of a mixed aqueous solution of chloroplatinic acid and rhodium chloride in the weight ratio as metals of 3:1 and in the total weight as noble metals of 0.04 g was put in an evaporating dish, then dissolved therein 0.04 g of a high molecular nonionic surface active agent consisting of a flaky Tetronics-type PO-EO block copolymer of an average molecular weight of 19,000 and an EO content of 70 % by weight. The solution was impregnated into 100 cc of the same activated alumina as used in Example 12 and processed in the same manner as in Example 11 to obtain a finished catalyst.

EXAMPLE 15

500 cc of a mixed aqueous solution of chloroplatinic acid and iridium hexachloride containing platinum and iridium in the weight ratio as metals of 3:1 and in the total weight of noble metals of 0.04 g was put in an evaporating dish, then dissolved therein 0.04 g of a high molecular nonionic surface active agent consisting of a flaky Tetronics-type PO-EO block copolymer of an average molecular weight of 33,500 and an EO content of 80 % by weight. The solution was impregnated into 100 cc of the same activated alumina as used in Example 12 and then subjected to the same condensation, drying and reducing treatment as in Example 11 to obtain a finished catalyst.

COMPARATIVE EXAMPLE (CONTROL) 4

50 cc of an aqueous palladium nitrate solution containing 0.08 g of palladium as metal was put in an evaporating dish, then added thereto 100 cc of the same activated alumina as used in Example 2. The solution thoroughly mixed with the support was evaporated to dryness and the support was then dried and calcined in the same manner as in Example 12 to obtain a finished catalyst.

COMPARATIVE EXAMPLE (CONTROL) 5

The same procedure as in Example 13 was repeated except that there was used no surface active agent to obtain a finished catalyst.

EXAMPLE 16

Initial activity tests were made on the catalysts obtained in Examples 11 to 15 and Controls 4 to 5, in the same test method as in Example 8, except that there was used propane in place of n-butane in Example 8, the gas was flowed at a rate of 2.5 litres/minute and the catalyst was used in an amount of 10 cc when the hydrocarbon was propylene and of 5 cc when the hydrocarbon was propane. The results obtained were as summerized in the following Table 3.

According to the Table 3, the catalysts in accordance with the present invention all have an activity indicated by a conversion at 200°C for propylene of 50 % or more, while none of the catalyst of the Controls exhibits a conversion at 200°C reaching 50 %. With respect to propane, the catalysts of the present invention are superior in activity at a high temperature of about 400°C to the catalysts of the Controls.

Table 3

| Example Nos. of catalyst | Propylene-CO system | | | | | | | | Propane-CO system | | | | | | | |
|---|---|---|---|---|---|---|---|---|---|---|---|---|---|---|---|---|
| | 200°C | | 225°C | | 250°C | | 300°C | | 200°C | | 225°C | | 350°C | | 400°C | |
| | CO | HC | CO | HC | CO | HC | CO | HC | CO | HC | CO | HC | CO | HC | CO | HC |
| 11 | 72 | 56 | 100 | 93 | 100 | 96 | 100 | 97 | 100 | 0 | 100 | 3 | 100 | 17 | 100 | 31 |
| 12 | 100 | 59 | 100 | 94 | 100 | 96 | 100 | 97 | 100 | 0 | 100 | 3 | 100 | 34 | 100 | 72 |
| 13 | 100 | 88 | 100 | 96 | 100 | 97 | 100 | 99 | 100 | 0 | 100 | 7 | 100 | 31 | 100 | 50 |
| 14 | 86 | 68 | 100 | 94 | 100 | 96 | 100 | 97 | 100 | 0 | 100 | 2 | 100 | 28 | 100 | 43 |
| 15 | 92 | 68 | 100 | 93 | 100 | 96 | 100 | 98 | 100 | 0 | 100 | 3 | 100 | 27 | 100 | 37 |
| Control 4 | 25 | 5 | 90 | 71 | 99 | 85 | 99 | 90 | 81 | 0 | 95 | 3 | 100 | 14 | 100 | 32 |
| Control 5 | 10 | 2 | 75 | 60 | 100 | 96 | 100 | 97 | 7 | 0 | 85 | 2 | 100 | 8 | 100 | 11 |

EXAMPLE 17

The activities and stabilities were determined on the catalysts of Examples 11 to 15 and Controls 4 and 5 using engine exhaust gases in the same methods as in Example 9 to obtain the results as summerized in the following Table 4.

Table 4

| Example Nos. of catalyst | Conversion (%) of CO and hydrocarbon | | | | | | | | | |
|---|---|---|---|---|---|---|---|---|---|---|
| | 0 hr | | 10 hrs | | 25 hrs | | 50 hrs | | 100 hrs | |
| | CO | HC | CO | HC | CO | HC | CO | HC | CO | HC |
| 11 | 98 | 92 | 98 | 93 | 99 | 93 | 98 | 93 | 98 | 92 |
| 12 | 99 | 93 | 99 | 92 | 98 | 91 | 98 | 91 | 98 | 91 |
| 13 | 99 | 93 | 99 | 95 | 98 | 94 | 99 | 94 | 99 | 94 |
| 14 | 99 | 94 | 98 | 94 | 99 | 94 | 99 | 94 | 99 | 94 |
| 15 | 99 | 93 | 99 | 95 | 99 | 94 | 98 | 94 | 99 | 94 |
| Control 4 | 98 | 93 | 98 | 88 | 97 | 85 | 97 | 83 | 96 | 82 |
| Control 5 | 97 | 89 | 97 | 87 | 97 | 87 | 96 | 87 | 96 | 86 |

According to the Table 4, the catalysts of the present invention exhibited during the test CO conversions of 98 to 99 % and HC conversions of 91 to 95 %, while the catalysts of the Controls were poor in the value of conversion itself and, in addition, degraded during the test.

EXAMPLE 18

The same procedure as in Example 11 was repeated except that there was used 0.20 g of polyethylene glycol of an average molecular weight of 20,000 in place of 0.4 g of a Tetronics-type nonionic surface active agent to obtain a catalyst. The relative distribution ratio of platinum was determined on the catalyst in the method as in Example 10 to obtain the result as shown in FIG. 3.

EXAMPLE 19

The same procedure was repeated as in Example 12 except that there was used 0.8 g of a flaky polyethylene glycol of an average molecular weight of 6,000 in place of 0.2 g of a Tetronics-type nonionic surface active agent to obtain a catalyst.

EXAMPLE 20

A catalyst was prepared in the same procedure as in Example 13 except that 0.4 g of a flaky polyethylene glycol of an average molecular weight of 6,000 was used in place of 0.04 g of a Tetronics-type nonionic surface active agent.

EXAMPLE 21

A catalyst was obtained by repeating the same procedure as in Example 14 except that 0.2 g of a polyethylene glycol of an average molecular weight of 20,000 was used in place of 0.04 g of a Tetronics-type nonionic surface active agent.

EXAMPLE 22

A catalyst was prepared in the same procedure as in Example 15 except that 0.2 g of a polyethylene glycol of an average molecular weight of 1,500 was used in place of 0.04 g of a Tetronics-type nonionic surface active agent.

EXAMPLE 23

The catalysts obtained in Examples 18 to 22 were subjected to determination of initial activities in the same test method as in Example 16 to obtain the results as summerized in the Table 5.

Table 5

| Example Nos. of catalyst | Propylene-CO system | | | | | | | | Propane-CO system | | | | | | | |
|---|---|---|---|---|---|---|---|---|---|---|---|---|---|---|---|---|
| | 200°C | | 225°C | | 250°C | | 300°C | | 200°C | | 225°C | | 350°C | | 400°C | |
| | CO | HC | CO | HC | CO | HC | CO | HC | CO | HC | CO | HC | CO | HC | CO | HC |
| 18 | 65 | 50 | 100 | 92 | 100 | 96 | 100 | 98 | 100 | 0 | 100 | 2 | 100 | 15 | 100 | 28 |
| 19 | 100 | 62 | 100 | 93 | 100 | 97 | 100 | 98 | 100 | 0 | 100 | 3 | 100 | 37 | 100 | 71 |
| 20 | 100 | 85 | 100 | 95 | 100 | 97 | 100 | 98 | 100 | 0 | 100 | 8 | 100 | 42 | 100 | 50 |
| 21 | 76 | 62 | 100 | 93 | 100 | 96 | 100 | 98 | 100 | 0 | 100 | 2 | 100 | 27 | 100 | 42 |
| 22 | 83 | 58 | 100 | 92 | 100 | 96 | 100 | 98 | 100 | 0 | 100 | 3 | 100 | 31 | 100 | 39 |

EXAMPLE 24

The catalysts obtained in Examples 18 to 22 were subjected to determination of activities and stabilities in the same test methods as in Example 9 to obtain the results as summerized in the Table 6.

Table 6

| Example Nos. of catalyst | Conversion (%) of CO and hydrocarbon | | | | | | | | | |
|---|---|---|---|---|---|---|---|---|---|---|
| | 0 hr | | 10 hrs | | 25 hrs | | 50 hrs | | 100 hrs | |
| | CO | HC | CO | HC | CO | HC | CO | HC | CO | HC |
| 18 | 98 | 92 | 99 | 93 | 99 | 92 | 98 | 92 | 98 | 93 |
| 19 | 99 | 94 | 99 | 93 | 98 | 92 | 98 | 91 | 98 | 91 |
| 20 | 99 | 94 | 99 | 94 | 99 | 95 | 99 | 93 | 99 | 94 |
| 21 | 99 | 94 | 99 | 93 | 98 | 94 | 99 | 93 | 99 | 94 |
| 22 | 99 | 93 | 98 | 94 | 99 | 94 | 98 | 93 | 99 | 94 |

According to the Table 6, the catalysts of the present invention exhibited CO conversions of 98 to 99 % and HC conversions of 91 to 95 %.

EXAMPLE 25

1.8 litre of an aqueous chloroplatinic acid solution containing 1.04 g of platinum as metal was put in a beaker, then dissolved therein 0.4 g of a nonionic surface active agent consisting of a Pluronics-type PO-EO block copolymer of an average molecular weight of 11,000 and an EO content of 80 % by weight. In the solution there were soaked the same activated alumina as used in Example 2 for 15 minutes, and the support was then dried at 100°C for 3 hours and calcined at 500°C for 3 hours in air to obtain a finished catalyst containing 0.2 g of platinum as metal.

COMPARATIVE EXAMPLE (CONTROL) 6

The same procedure as in Example 25 was repeated except that there was not used any nonionic surface active agent to obtain a finished catalyst supporting the same amount of platinum with the finished catalyst of Example 25.

EXAMPLE 26

The catalysts obtained in Example 25 and Control 6 were subjected to low temperature initial activity tests in the following manner:

Each 20 cc of the catalysts were packed in separate stainless steel reaction tubes of an inner diameter of 25 mm. A gaseous mixture consisting of 1 % of carbon monoxide, 1,000 ppm of propylene and the balance of air was introduced at a gas temperature on the entrance of the reaction tube of 160, 170 or 180°C at a space velocity of 20,000 hr$^{-1}$ and, after the system reached the stationary state at the prescribed temperatures, the effluent from the reaction tube was analysed by means of a gas chromatography manufactured by Kabushiki Kaisha Shimazu Seisakusho, Japan. The CO concentration was determined at a column temperature of 96°C using a molecular sieve and the propylene concentration was determined at a column temperature of 100°C using 15 % dioctyl sebacate + 15 % behenic acid on a camerite CK carrier of 80 to 100 mesh to obtain the results as summerized in the Table 7 in which numeral values indicating the conversions of CO and propylene (HC).

Table 7

| Example Nos. of catalyst | 160°C | | 170°C | | 180°C | |
|---|---|---|---|---|---|---|
| | CO | HC | CO | HC | CO | HC |
| 25 | 18 | 18 | 95 | 90.5 | 99.5 | 99 |
| Control 6 | 2 | 7 | 4 | 7 | 85 | 80 |

The above Table indicates that the catalyst of the present invention is superior in its low temperature activity.

EXAMPLE 27

The catalysts obtained in Example 25 and Control 6 were subjected to activity tests in a waste gas converter in a phthalic anhydride manufacturing plant. For the test, 130 cc of the catalyst was packed in a stainless steel reaction tube of an inner diameter of 53 mm and heated to a prescribed temperature by means of an electric heater, then passed therethrough a waste gas while judging the activity by sniffing the effluent from the reaction tube. In case of the catalyst of the present invention the effluent became odorless at a gas temperature on the entrance of the reaction tube of 240°C, while, on the other hand, in case of the catalyst of Control 6 the odor of the effluent still not reduced at a gas temperature on the entrance of 240°C and became insensible at a gas temperature of 270°C.

EXAMPLE 28

50 cc of an aqueous solution of iridium hexachloride and rhodium trichloride containing iridium and rhodium in a weight ratio as metals of 1:1 and in a total weight as noble metals of 0.02 g was put in an evaporating dish, then dissolved therein 0.2 g of poly(oxyethylene) nonylphenyl ether of an average molecular weight of 1,800. 100 cc of the same activated alumina as used in Example 1 was impregnated with the solution, and, after concentration to dryness on a water bath, dried at 90°C for 3 hours and reduced at 550°C for 3 hours in a stream of gaseous nitrogen containing 5 % of hydrogen to obtain a finished catalyst.

A stainless steel reaction tube of an inner diameter of 30 mm was packed with 30 cc of the catalyst thus obtained and portion of the exhaust gas from a commercially available six-cylindered engine of a displacement of 2,000 cc equipped with a dynamometer was preheated by an electric furnace to a temperature of 400° to 750°C and introduced into the reaction tube at a rate of 15 N liters/minute (space velocity of 30,000 hr$^{-1}$) to determine the initial activity for purification of nitrogen oxides at the prescribed temperatures. The catalyst was subjected also to a 5,000 km running durability test at a gas temperature of 700°C under the following running conditions: number of revolution 1,500 r.p.m. boost pressure 380 mm Hg, running speed 50 km/hr air/fuel ratio 14, operated on a lead-free gasoline. The average composition of of the exhaust gas was: CO 0.75 %, hydrocarbon 1,800 ppm, (as methane), oxygen 0.5 %, NO 1,600 ppm, the balance of nitrogen. Ammonia formed in the catalyst bed was determined by collecting a defined quantity of the effluent gas from the reaction tube in a 0.5 % aqueous boric acid solution and titrating the solution with a standard sulfuric acid solution. Analysis of the effluent was made by means of a MEXA-18 type analyser, manufactured by Kabushiki Kaisha Horiba Seisakusho; CO being determined by means of a non-dispersive infrared gas analyser, HC being by means of a flame ionization detector gas analyser, $O_2$ being by means of a magnetic gas analyser and NO being by means of a nondispersive infrared gas analyser. The results of initial activity test and durability test were as summerized in the following Table 8.

Table 8

| Gas temperature (°C) | True conversion of NO (except for ammonia) | |
|---|---|---|
| | Initial | After running of 5,000km |
| 400 | 68.3 % | — |
| 600 | 80.5 % | — |
| 700 | 90.0 % | 87.4 % |
| 750 | 92.2 % | — |

What is claimed is:

1. In the production of noble metal catalysts in which a noble metal is supported onto a refractory porous inorganic support from an aqueous medium containing a noble metal or compound thereof, the improvement comprising
   a. depositing a high concentration of said noble metal on the surface of a refractory porous support having an average particle diameter of 1.5 to 15 mm. by impregnating said support with an aqueous solution or dispersion of said noble metal or a compound thereof in the presence of a nonionic surface active agent of the poly (oxyethylene) type having an average molecular weight of at least 500, and
   b. subjecting the resulting supported catalyst to activation.

2. A method of claim 1 in which the nonionic surface active agent of poly(oxyethylene) type is at least one member of the group consisting of polyethylene glycols, poly(oxyethylene) alkyl ethers, poly(oxyethylene) alkylaryl ethers, poly(oxyethylene) alkyl esters, poly(oxyethylene) alkylamines, poly(oxyethylene) alkylamides, fatty acid esters of poly(oxyethylene)sorbitanes and poly(oxethylene)-poly(oxypropylene) block copolymers.

3. A method of claim 1 in which the nonionic surface active agent is used in the amount of 0.1 to 50 g per litre of the support.

4. A method of claim 1 in which the nonionic surface active agent of poly(oxyethylene) type is used in the amount of 0.2 to 20 g per litre of the support.

5. A method of claim 1 in which the noble metal is supported in the amount as metal of 0.01 to 5 g per litre of the support.

6. A method of claim 1 in which the noble metal is supported in the amount as metal of 0.05 to 2 g per litre of the support.

7. A method of claim 3 in which the nonionic surface active agent of poly(oxyethylene) type is of the general formula

where, in the formula, $a$, $b$ and $c$ are greater than 1 and $(a+b+c)$ is from 20 to 400, and of an average molecular weight of at least 1,000.

8. A method of claim 3 in which the nonionic surface active agent of poly(oxyethylene) type is of an average molecular weight of at lease 1,000 and of the general formula

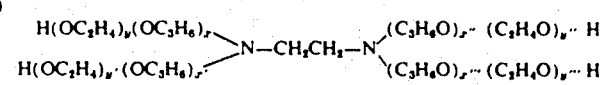

where, in the formula, $x$, $x'$, $x''$, $x'''$, $y$, $y'$, $y''$, and $y'''$ are greater than 1 and $(x + x' + x'' + x''' + y + y' + y'' + y''')$ is from 20 to 800.

9. A method of claim 3 in which the nonionic surface active agent of poly(oxyethylene) type is a polyethylene glycol of an average molecular weight of at least 1,000.

10. A method of claim 3 in which the nonionic surface active agent of poly(oxyethylene) type is a fatty acid ester of a poly(oxyethylene)sorbitane of an average molecular weight of at least 1,000.

11. A method of claim 3 in which the nonionic surface active agent of poly(oxyethylene) type is a poly(oxyethylene) alkyl ether of an average molecular weight of at least 500.

12. A method of claim 3 in which the nonionic surface active agent of poly(oxyethylene) type is a poly(oxyethylene) alkylaryl ether of average molecular weight of at least 1,000.

13. A method of claim 1 in which the activation is carried out by calcination of the treated support at a temperature of 300° to 700°C in an oxidative atmosphere.

14. A method of claim 1 in which the activation is carried out by reduction of the treated support at a temperature of 150° to 600°C in a reductive atmosphere.

15. A method of claim 5 in which the noble metal is at least one member selected from the group consisting of platinum, palladium, iridium, rhodium and ruthenium.

16. A method of claim 5 in which the noble metal is at least one member selected from the group consisting of platinum and palladium.

* * * * *